United States Patent [19]

Lahr et al.

[11] Patent Number: 5,649,158

[45] Date of Patent: Jul. 15, 1997

[54] METHOD FOR INCREMENTALLY ARCHIVING PRIMARY STORAGE TO ARCHIVE STORAGE BY UTILIZING BOTH A PARTITION ARCHIVE STATUS ARRAY AND A PARTITION MAP

[75] Inventors: Jonathan Ellsworth Lahr; Gerald Francis McBrearty; Johnny Meng-Han Shieh; Leonard Barry Tropiano, all of Austin, Tex.

[73] Assignee: International Business Machines Corporation, Armonk, N.Y.

[21] Appl. No.: 392,586

[22] Filed: Feb. 23, 1995

[51] Int. Cl.⁶ .............................. G06F 12/16; G06F 11/20
[52] U.S. Cl. ..................... 395/488; 395/894; 395/497.04
[58] Field of Search ................................. 395/839, 874, 395/497.04, 885, 894, 488

[56] References Cited

U.S. PATENT DOCUMENTS

| | | | |
|---|---|---|---|
| 4,686,620 | 8/1987 | Ng | 364/200 |
| 5,150,473 | 9/1992 | Zulch | 395/425 |
| 5,210,866 | 5/1993 | Milligan et al. | 395/575 |
| 5,276,849 | 1/1994 | Patel | 395/425 |
| 5,276,860 | 1/1994 | Fortier et al. | 395/575 |
| 5,276,867 | 1/1994 | Kenley et al. | 395/600 |
| 5,446,884 | 8/1995 | Schwendemann et al. | 395/600 |
| 5,454,099 | 9/1995 | Myers et al. | 395/575 |
| 5,455,946 | 10/1995 | Mohan et al. | 395/600 |

FOREIGN PATENT DOCUMENTS 0600458  6/1994  United Kingdom.

OTHER PUBLICATIONS

"Recovery from Single Critical Hardware Resource Unavailability", IBM Technical Disclosure Bulletin, vol. 36, No. 8, Aug. 1993, pp. 607–612.
"User Data Area Protection", IBM Technical Disclosure Bulletin, vol. 35, No. 4B, Sep. 1992, pp. 481–483.
"Oscillation Recovery System with Concurrent Stand–Alone Dump", vol. 36, No. 3, Mar. 1993, pp. 149–150.

*Primary Examiner*—Lance Leonard Barry
*Assistant Examiner*—Rehana Perveen Krick
*Attorney, Agent, or Firm*—Diana L. Roberts; Richard A. Henkler

[57] ABSTRACT

The present invention is a computer-implemented method, memory, and computer system for directing a computer system to incrementally archive primary storage to archive storage based on partitions. The primary storage is divided into a plurality of partitions, where at least one the partitions contains information. The method includes the steps of receiving an incremental archive request from user controls and, in response, storing in the archive storage a copy of the information in each partition that has been modified since the last archive, if any.

1 Claim, 6 Drawing Sheets

METHOD FOR INCREMENTALLY ARCHIVING PRIMARY STORAGE TO ARCHIVE STORAGE BY UTILIZING BOTH A PARTITION ARCHIVE STATUS ARRAY AND A PARTITION MAP

BACKGROUND OF THE INVENTION

1. Field of the Invention

The present invention relates to a technique for providing fast incremental archive of permanent storage using minimal archive storage space.

2. Background Information and Description of the Related Art

Many computer systems employ a conventional archiving scheme to back up one or more disks. This archiving scheme writes a copy of an entire file to magnetic tape each time a user modifies and archives that file. If subsequent modifications are made to the file and the user again desires to archive it, the archiving scheme appends the entire file to the previously archived file on tape.

This archiving scheme presents disadvantages and limitations. First, even if the user makes the smallest modification to a file, the archiving scheme writes the entire file to tape when the user archives it. Therefore, this archiving scheme requires substantial amounts of time to archive large files. Second, because this archiving scheme appends each archived file to the end of the previously archived file, additional amounts of tape are continuously required.

Accordingly, great demand exists for an archiving system that is much faster than conventional archiving schemes and requires no additional tape. Such an archiving system should not completely rewrite a file each time a modification is made, but rather should only rewrite or archive the modified sections of that file.

SUMMARY

The present invention is a computer-implemented method, memory, and computer system for directing a computer system to incrementally archive primary storage to archive storage based on partitions. The primary storage is divided into a plurality of partitions, where at least one of the partitions contains information. The method includes the steps of receiving an incremental archive request from user controls and, in response, storing in the archive storage a copy of the information in each partition that has been modified since the last archive, if any.

DETAILED DESCRIPTION OF THE PREFERRED EMBODIMENT

The following detailed description is of the best presently contemplated mode for carrying out the invention. This description is not to be viewed in a limiting sense, but is made merely for the purpose of illustrating the general principles of the invention, the scope of which is only defined by the appended claims.

Figure 1:
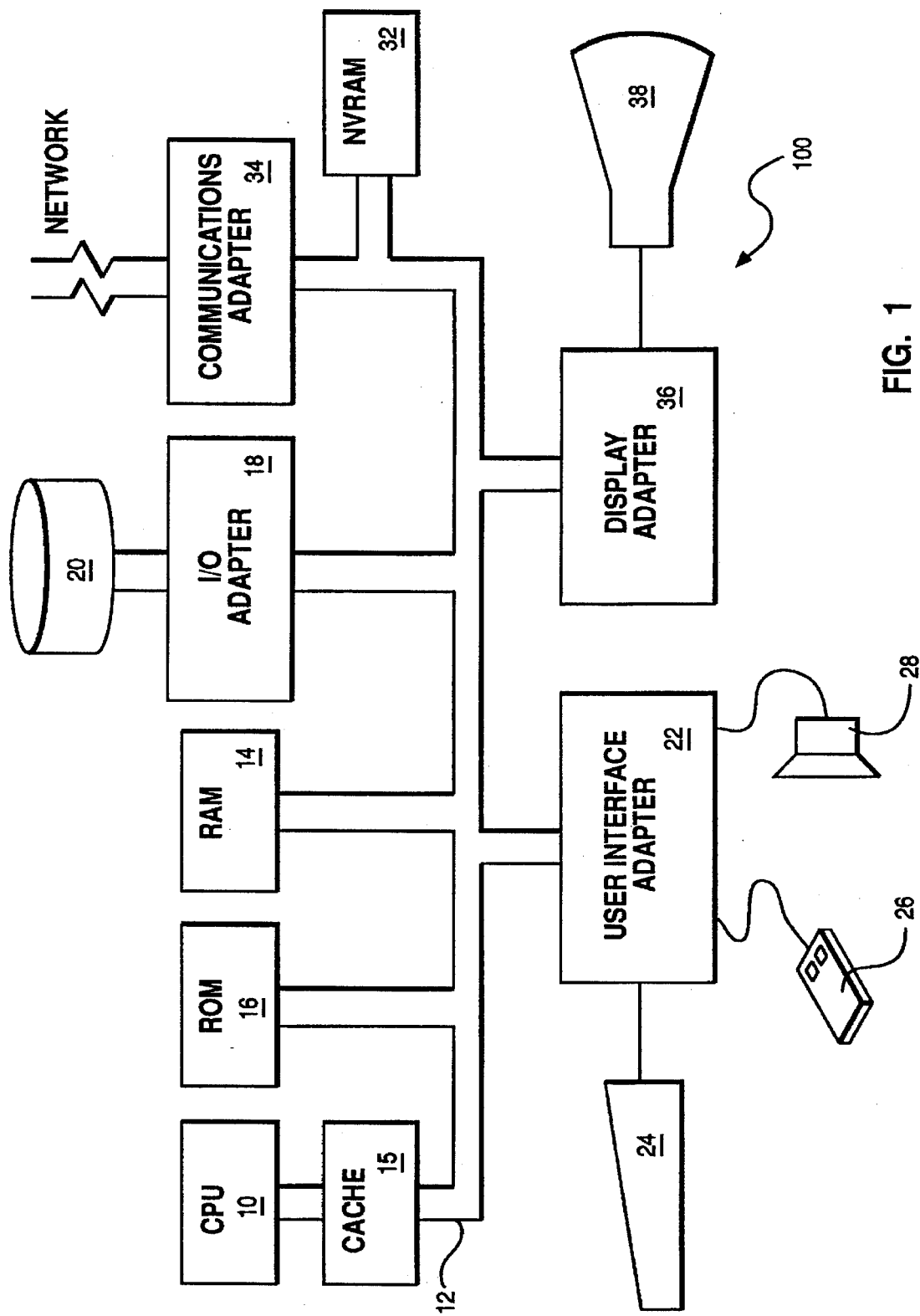
FIG. 1 illustrates a suitable representative hardware configuration in accordance with the present invention.

The present invention includes an apparatus, memory embodying computer-readable code, and a method for archiving hard disk storage. The present invention is preferably practiced in a suitable representative hardware configuration, such as a laptop computer or the hardware configuration illustrated in FIG. 1.

Workstation 100 includes any suitable central processing unit 10, such as the PowerPC™ 601, and a number of other units interconnected via system bus 12. Illustratively, workstation 100 includes random access memory (RAM) 14, read only memory (ROM) 16, display adapter 36 for connecting system bus 12 to display device 38, and I/O adapter 18 for connecting peripheral devices (e.g. hard disks, read/write optical disks, CD-ROMs, and tape drives 20) to system bus 12. Workstation 100 further includes user interface adapter 22 for connecting user controls, such as keyboard 24, mouse 26, speaker 28, microphone 32, a touch screen device (not shown), and/or other user interface devices, to system bus 12. Communication adapter 34 connects workstation 100 to a data processing network.

Any suitable operating system may interface a user to workstation 100. However, in the preferred embodiment, IBM's AIX® operating system (OS) interfaces the user to workstation 100. References to "Archive medium" include magnetic tape drive 20 for retaining copies of the information stored on the hard disk. Alternatively, any suitable type of storage media could be used to retain the copies, such as a write/read optical disk.

The preferred embodiment includes a utility, which may be incorporated into the OS, that resides within a computer-readable media for directing the operation of workstation 100. Any suitable computer-readable media may retain the utility, such as RAM 14, ROM 16, a magnetic diskette, magnetic tape, or optical disk (the last three being located in disk and tape drives 20). The utility contains data structures and detailed logic (described herein) that are transmitted as "signals" recognizable by workstation 100. For ease in explanation, the following specification describes the utility as performing the various tasks of the present invention. In actuality, the utility merely controls and directs CPU 10 to perform those various tasks.

The OS logically divides all primary disk storage into equally-sized partitions, called physical partitions. The user typically modifies the contents of some of those physical partitions before requesting an archive.

Figure 2:
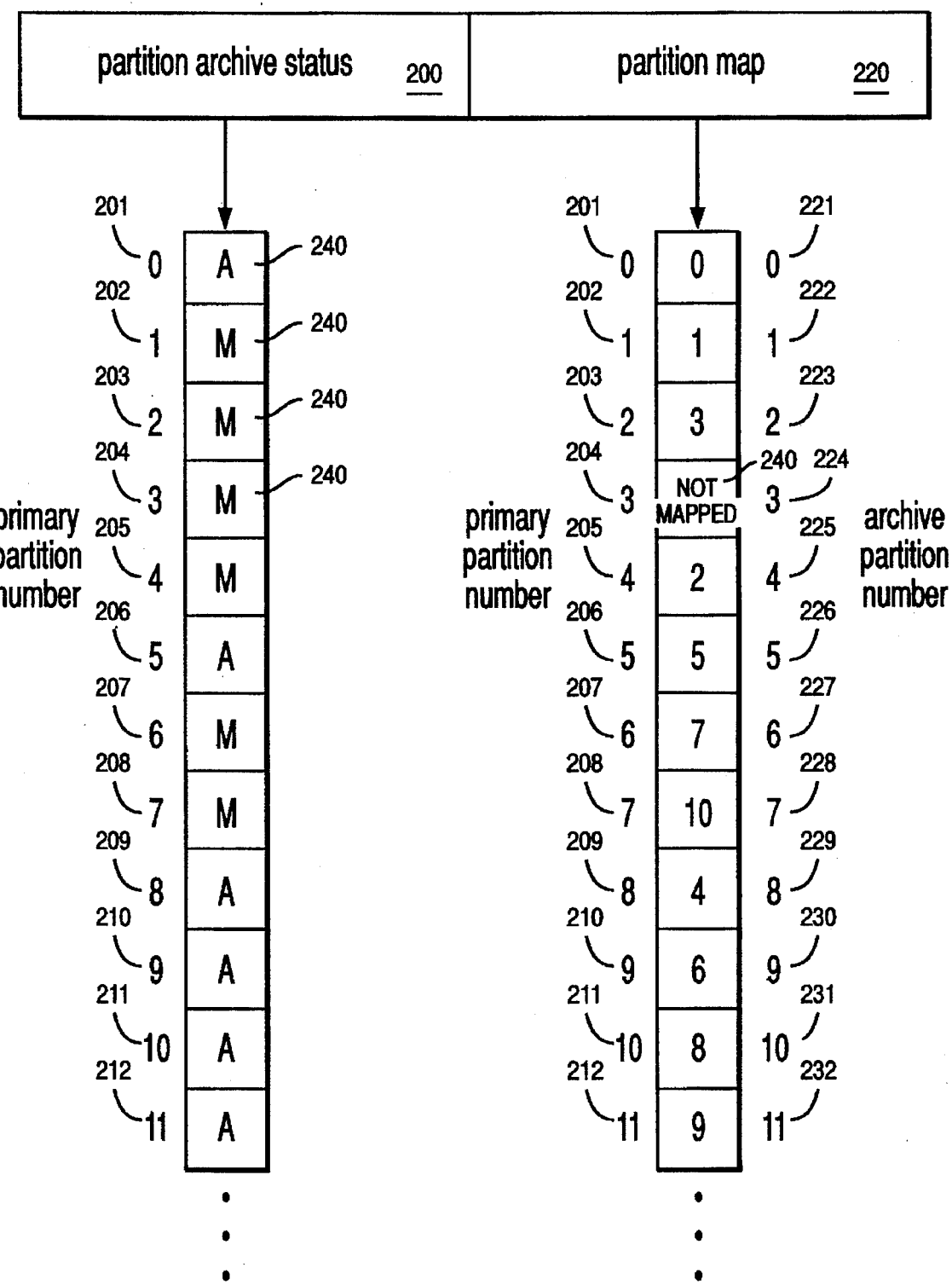
FIG. 2 illustrates a partition archive status data structure for tracking the status of disk partitions and a partition map data structure for correlating the physical location on the archive storage media with the physical partitions on the disk.

FIG. 2 illustrates how the utility manages and tracks modifications to physical partitions. To detect whether a user has modified a physical partition, the utility examines a partition archive status array table. For example, partition archive status array 200 contains the modification status for physical partitions 201–212. Each status bit 240 indicates whether the information residing in its physical partition has been modified since the last archive operation. The utility initially sets all status bits 240 to "Archived."

The utility tracks user access to each physical partition 201–212 by setting status bit 240. For example, the utility sets status bit 240 to a "1" bit to indicate "Modified", and sets status bit 240 to a "0" bit to indicate "Archived." In an incremental archive, the utility selects all physical partitions having a status bit of "Modified" (indicating that they have been modified since the last archive) and copies them to the archive medium. Therefore, during incremental archive, the utility archives only those physical partitions marked "Modified".

Once the archive is accomplished, the utility resets every status bit 240 corresponding to each archived physical partition to "Archive" (indicating that those physical partitions have not been modified since the last archive operation). This type of selective archive operation prevents archiving of "empty" partitions that have never been modified.

For optimal use, the utility maintains partition archive status array 200 primarily in RAM 14, while occasionally storing it to disk.

Figure 3:
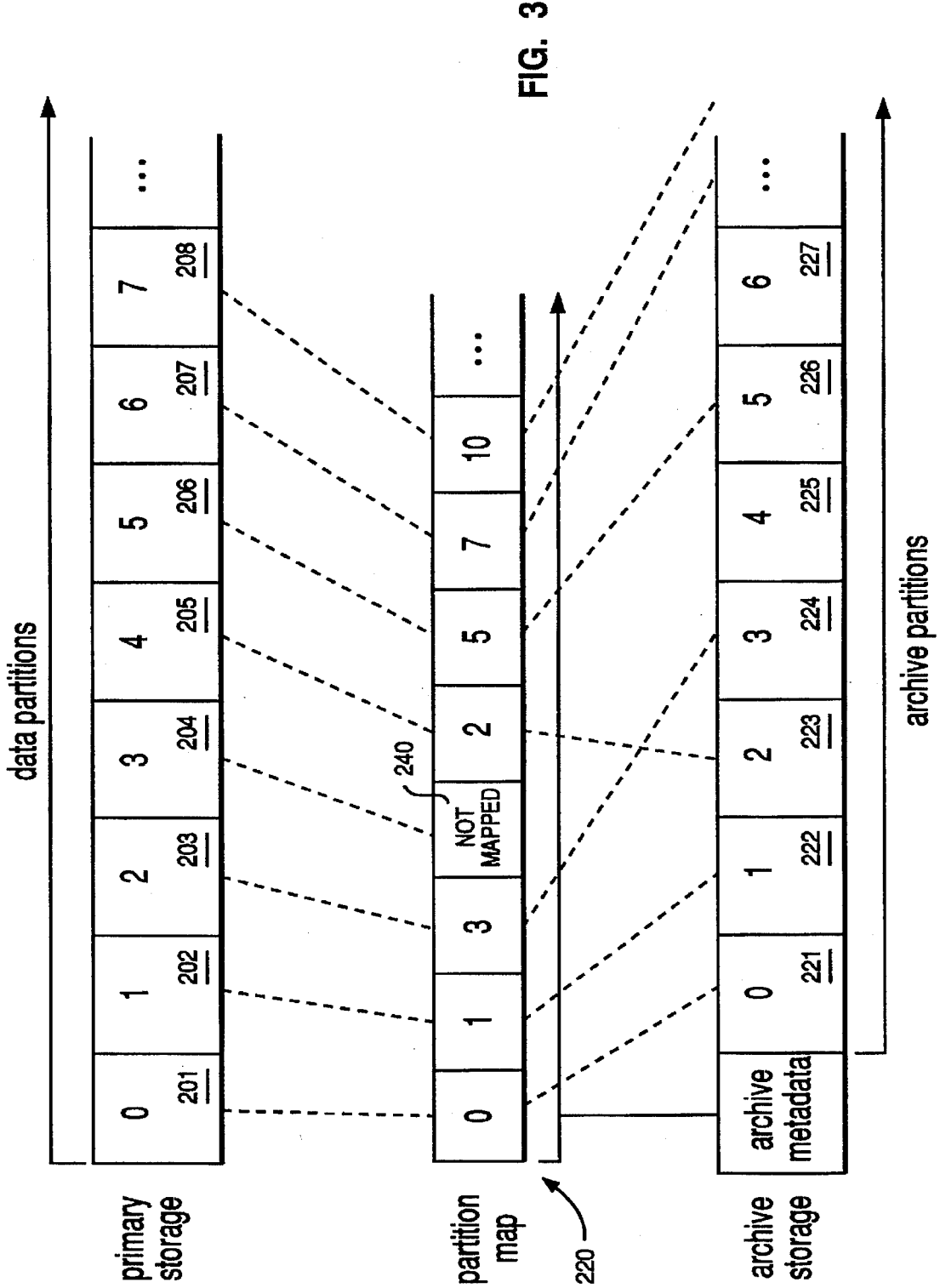
FIG. 3 illustrates how the utility manages and tracks modifications to physical partitions.

Referring to FIGS. 2 and 3, entries in partition map array 220 contain a mapping from one physical partition 201–212 to a corresponding physical partition 221–232 on the archive medium. Therefore, array 220 indicates exactly where the contents of each physical partition are copied on the archive media. When a physical partition is not currently used to hold valid data, such as physical partition 204, array 200 holds an invalid value for that particular partition. For example, array entry 240 indicates that partition 204 is "not mapped" and should not be considered during an incremental backup process. The utility maintains partition map array 220 on both the hard disk and archive media and updates it during archive operations or during the deletion of a physical partition from its logical volume.

Figure 4:
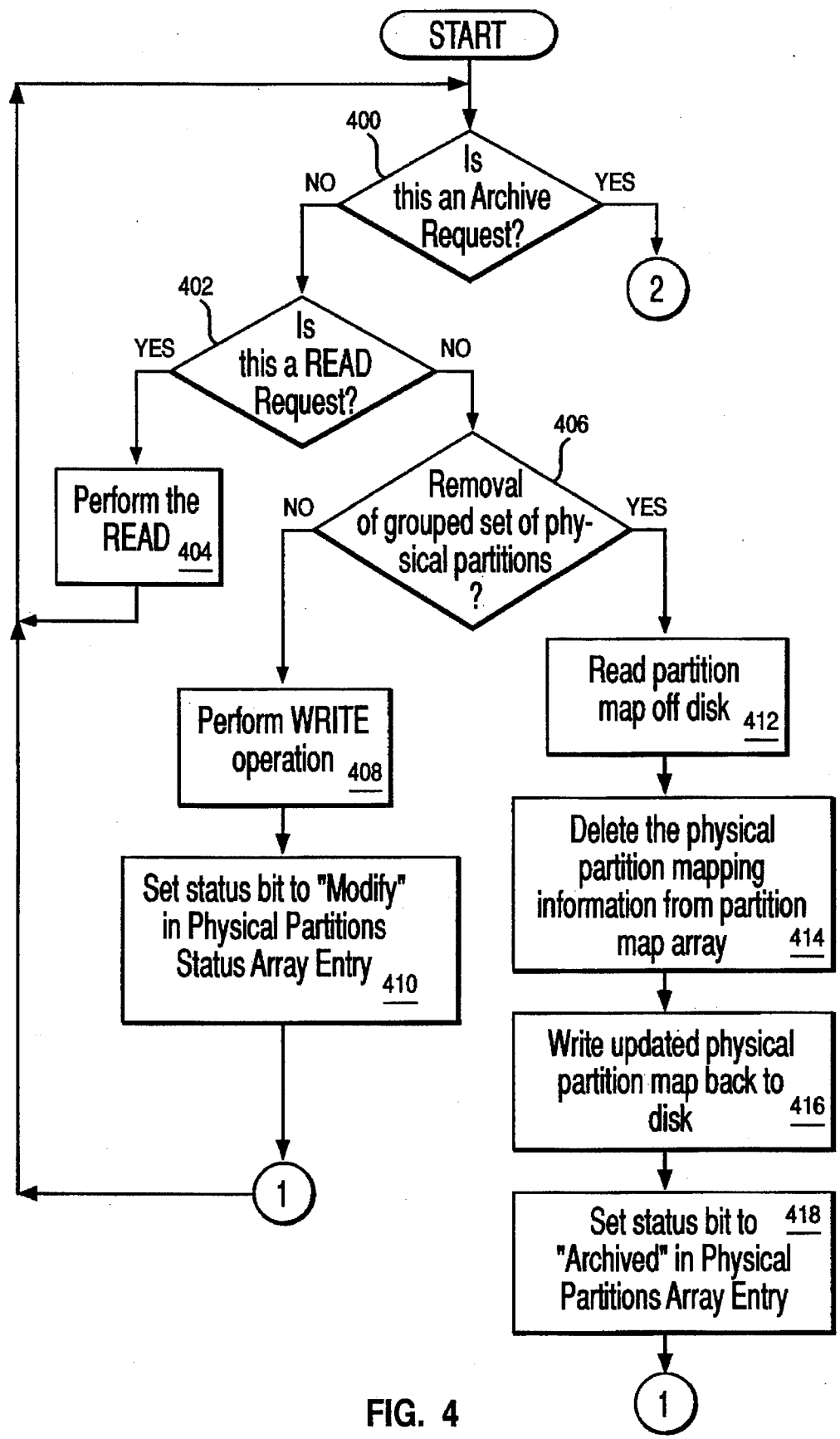
FIG. 4 illustrates detailed logic for implementing an incremental backup.

FIG. 4 illustrates detailed logic for implementing an incremental backup. At 400, the utility determines if an archive request has been generated by user controls. If the utility receives an archive request, control is directed to FIG. 5. If not, at 402, the utility determines if the request is a READ request. Because a READ of a physical partition does not affect its contents, the utility performs no action on array 200 or 220 when a READ occurs. Therefore, at 404, the OS performs the READ and control returns to 400.

If a READ request was not received, at 406, the utility determines if the request is to delete a grouped set of physical partitions. If not, at 408, the utility performs a WRITE operation. At 410, for each physical partition that has been modified, the utility sets status bit 240 to "Modify" in partition status array 200. Control returns to 400.

Returning to 406, if the request is to delete a grouped set of physical partitions, at 412, the utility reads partition map array 220 from the hard disk. At 414, the utility marks each array entry corresponding to each deleted physical partition "not mapped." At 416, the utility writes an updated partition map array 220 onto the disk and, at 418, the utility sets status bit 240 to "archived" in partition archive status array 200 for each deleted physical partition. Control returns to 400.

Figure 5:
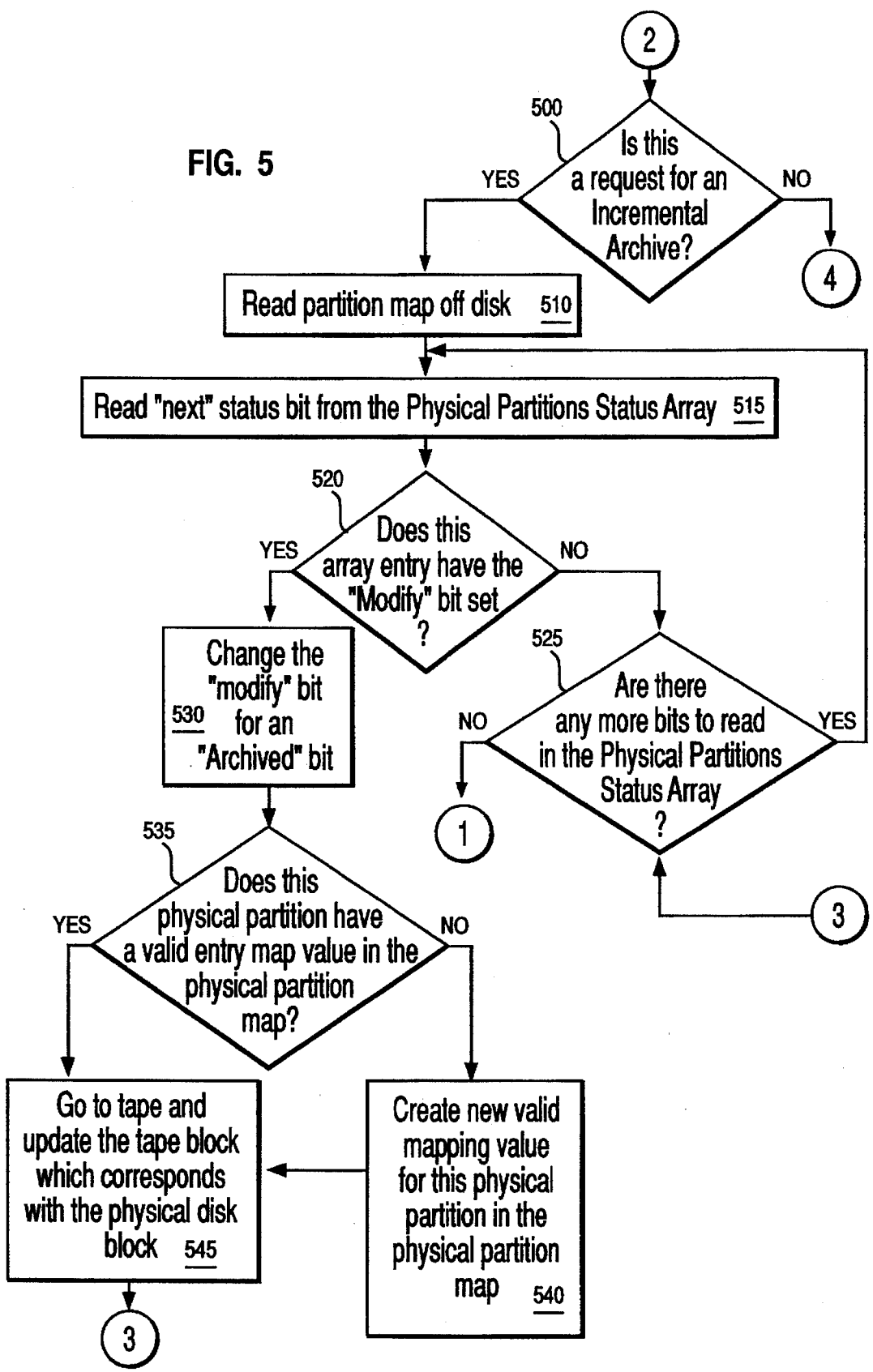
FIG. 5 illustrates detailed logic for implementing an archive request.

Returning to 400, if the utility determines that the request is an archive request, control is directed to 500 in FIG. 5. At 500, the utility determines if the request is for an incremental archive. If so, at 510, the utility reads partition map array 220 from the disk. At 515, the utility reads the first status bit 240 from partition archive status array 200. At 520, the utility determines if the first status bit 240 has been set to "Modify." If not, at 525, the utility determines if there are any more status bits 240 to be read in partition archive status array 200. If so, control returns to 515, where the next status bit 240 is read. If not, control returns to 400 in FIG. 4.

At 520, if the utility determines status bit 240 has been set to "modify," at 530, the utility changes the "modify" bit to an "archive" bit. At 535, the utility determines if the modified physical partition has a valid array entry in partition map array 220. If not, at 540, the utility creates an array entry for the modified physical partition in partition map array 220. If the modified physical partition does have a valid array entry in partition map array 220, at 545, the utility locates the archive partition corresponding to the modified physical partition and performs an update at that location. Control is then directed to 525 where the utility determines if there are any more status bits to read in partition archive status array 200.

Figure 6:
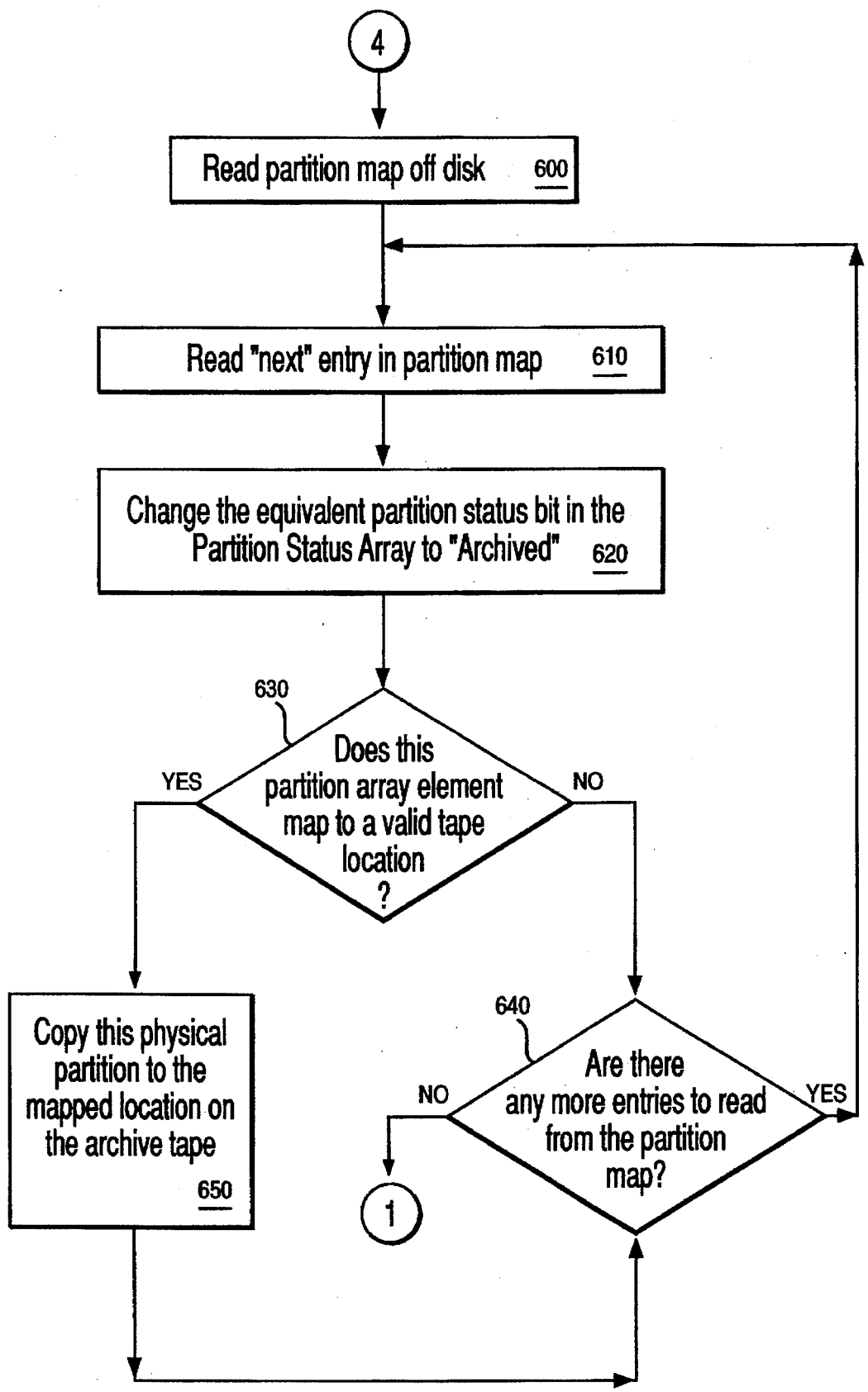
FIG. 6 illustrates detailed logic for implementing a full backup.

Returning to 500, if the utility determined that the request was not for an incremental archive but rather a full backup, control is directed to FIG. 6. In this case, the utility is not concerned with the status bit of physical partitions. At 600, the utility loads partition map array 220 from the disk into RAM and proceeds to archive every physical partition to tape that has a valid array entry. To do so, at 610, the utility reads the first array entry in partition map array 220. At 620, the utility sets status bit 240 in partition archive status array 200 corresponding to the array entry to "Archive." At 630, the utility determines if the array entry maps to a valid archive partition. Those that are marked "not mapped" indicate blank, unused, or deleted physical partitions that are no longer recognized by the system and should not be archived. If the array entry is not properly mapped, at 640, the utility determines if there are any more array entries to read from partition map array 220. If not, control returns to block 400 in FIG. 1. If so, control returns to 610, where the utility reads the next array entry.

Returning to 630, if the array entry does map to a valid tape location, at 650, the utility copies the contents of the primary storage physical partition to the mapped location on the archive media and control returns to 640. Once this full archive is complete, the utility stores partition map array 220 to a reserved portion of the archive media for use when a restoration is required.

The utility performs a restore operation by copying selected archive partitions from the archive media onto their corresponding primary physical partitions. Like the archive operation, the utility sorts the archive partition numbers and accesses the saved data for restoration in sequential order to minimize data access time. For an incremental restore, the utility examines partition archive status array 200 and restores only those physical partitions marked "Modified". The remaining physical partitions marked "Archived" match what was written to tape, and thus do not need any type of data restoration. When the utility copies a partition from archive to primary storage, the status bit is set to "Archived" because the archive and primary data match.

What is claimed is:

1. A computer-implemented method for directing a computer system to incrementally archive primary storage to archive storage, the primary storage being divided into a plurality of partitions, at least one the partitions having contents stored therein, comprising the steps of:

in response to receiving a full backup request from user controls, scanning a partition map having a plurality of array entries, each array entry indicating either an invalid entry, or a location on the archive storage where a corresponding partition is or should be stored;

for each partition having an array entry indicating where a corresponding partition is or should be stored, copying the partition to the location indicated by the array entry;

in response to receiving an incremental archive request from user controls, scanning a partition archive status array having a plurality of entries, each entry indicating whether a corresponding partition has been modified since a previous archive;

if a first entry indicates a modified partition, setting the first entry to an archive status;

if the modified partition has an entry in the partition map indicating where the modified partition is or should be stored in the archive storage, storing the contents of the modified partition in the archive storage at the location indicated by the entry;

if the modified partition has an invalid entry in the partition map, creating an entry in the partition map indicating an archive partition for storing a copy of the modified partition; and storing a copy of the contents of the modified partition to the archive partition.

* * * * *